(12) United States Patent
Weaver et al.

(10) Patent No.: US 12,244,094 B2
(45) Date of Patent: *Mar. 4, 2025

(54) POKE-IN WIRE CONNECTOR FOR POWER CONNECTOR ASSEMBLY

(71) Applicants: TE Connectivity Solutions GmbH, Schaffhausen (CH); InSinkErator LLC, Mount Pleasant, WI (US)

(72) Inventors: Brian Keith Weaver, Harrisburg, PA (US); Divya Shukla, Harrisburg, PA (US); Walter Bennage, Mount Pleasant, WI (US); Kelly Gamble, Mount Pleasant, WI (US); Jeff Ward, Mount Pleasant, WI (US)

(73) Assignees: TE Connectivity Solutions GmbH, Schaffhausen (CH); InSinkErator LLC, Mount Pleasant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,558

(22) Filed: Aug. 14, 2023

(65) Prior Publication Data

US 2023/0387627 A1 Nov. 30, 2023

Related U.S. Application Data

(63) Continuation of application No. 17/989,849, filed on Nov. 18, 2022, now Pat. No. 11,764,516, which is a
(Continued)

(51) Int. Cl.
*H01R 13/58* (2006.01)
*H01R 4/48* (2006.01)
*H01R 24/22* (2011.01)

(52) U.S. Cl.
CPC ........... *H01R 13/5816* (2013.01); *H01R 4/48* (2013.01); *H01R 4/4823* (2023.08);
(Continued)

(58) Field of Classification Search
CPC ................. H01R 4/48365; H01R 4/48275; H01R 11/05; H01R 13/113; H01R 13/02;
(Continued)

(56) References Cited

U.S. PATENT DOCUMENTS 11,532,909 B2 * 12/2022 Weaver .................... H01R 4/48
11,764,516 B2 * 9/2023 Weaver .................... H01R 4/48
439/472

(Continued)

FOREIGN PATENT DOCUMENTS

CN 202855982 U 4/2013
CN 104733921 A 6/2015
(Continued)

OTHER PUBLICATIONS

Office Action for corresponding CN Application No. 20211098100.7 dated Oct. 7, 2024 (21 pages).
(Continued)

*Primary Examiner* — Jean F Duverne
(74) *Attorney, Agent, or Firm* — Jay J. Hoette; The Small Patent Law Group, LLC

(57) ABSTRACT

A poke-in terminal includes a main body, a tab terminal socket at a mating end, and a wire socket at a terminating end. The tab terminal socket includes walls forming a tab terminal receptacle configured to receive a tab terminal. Upper and lower beam contacts extend into the tab terminal receptacle to interface with the tab terminal. The wire socket includes walls forming a wire receptacle configured to receive a wire. Poke-in retention beams extend into the wire receptacle to interface with the wire when poked into the wire socket. The wire socket includes a wire release element configured to be actuated to release the poke-in retention beams from the wire.

20 Claims, 13 Drawing Sheets

Related U.S. Application Data continuation of application No. 17/005,506, filed on Aug. 28, 2020, now Pat. No. 11,532,909.

(52) U.S. Cl.
CPC ........... *H01R 4/4828* (2023.08); *H01R 24/22* (2013.01); *H01R 4/4848* (2023.08)

(58) Field of Classification Search
CPC .. H01R 13/502; H01R 13/633; H01R 13/639; H01R 24/00; H01R 13/5816; H01R 24/22; H01R 4/48; H02G 15/007
See application file for complete search history.

(56) References Cited

U.S. PATENT DOCUMENTS

| | | |
|---|---|---|
| 2021/0087801 A1 | 3/2021 | Ward et al. |
| 2021/0238834 A1 | 8/2021 | Ward et al. |

FOREIGN PATENT DOCUMENTS

| | | |
|---|---|---|
| CN | 204966753 U | 1/2016 |
| CN | 110073555 A | 7/2019 |

OTHER PUBLICATIONS

Office Action for corresponding CN Application No. 202110981100.7 dated Nov. 27, 2024 (23 pages).

\* cited by examiner

POKE-IN WIRE CONNECTOR FOR POWER CONNECTOR ASSEMBLY

CROSS REFERENCE TO RELATED APPLICATIONS

This application is a continuation application of, and claims priority to U.S. application Ser. No. 17/989,849, filed 18 Nov. 2022, titled "POKE-IN WIRE CONNECTOR FOR POWER CONNECTOR ASSEMBLY" which is a continuation application of U.S. application Ser. No. 17/005,506, filed 28 Aug. 2020, titled "POKE-IN WIRE CONNECTOR FOR POWER CONNECTOR ASSEMBLY" (now U.S. Pat. No. 11,532,909, issued 20 Dec. 2022), the subject matter of which are herein incorporated by reference in its entirety.

BACKGROUND OF THE INVENTION

The subject matter herein relates generally to electrical connectors for electrical devices.

Cables are electrically connected to electrical devices by terminating wires to terminals within the electrical devices. For example, the cables may be power cables having power wires, such as a hot wire, a neutral wire, and a ground wire, which are electrically connected to wires or terminals of the electrical device. The wires are typically terminated to device wires of the electrical device using wire nuts. The wires may be terminated to device terminals of the electrical device using contacts crimped to the wires. Conventional terminations may be unreliable, particularly when novice installers, such as homeowners, perform the terminations. Additionally, access to the device terminals or device wires is typically limited, making termination of the wires to the device wires or the device terminals difficult.

A need remains for electrical connectors that may be reliably coupled to electrical devices.

BRIEF DESCRIPTION OF THE INVENTION

In one embodiment, a poke-in terminal is provided. The poke-in terminal includes a main body extending between a mating end and a terminating end of the poke-in terminal. The poke-in terminal includes a tab terminal socket at the mating end. The tab terminal socket includes walls forming a tab terminal receptacle configured to receive a tab terminal. The tab terminal socket includes upper beam contacts extending from a top wall into the tab terminal receptacle to interface with the tab terminal and lower beam contacts extending from a bottom wall into the tab terminal receptacle to interface with the tab terminal. The poke-in terminal includes a wire socket at the terminating end. The wire socket includes walls forming a wire receptacle configured to receive a wire. The wire socket includes a first poke-in retention beam configured to interface with the wire when poked into the wire socket and a second poke-in retention beam configured to interface with the wire when poked into the wire socket. The wire socket includes a wire release element configured to be actuated to release the first and second poke-in retention beams from the wire.

In another embodiment, a poke-in wire connector provides a housing including a top housing wall, a bottom housing wall, a first housing side wall, and a second housing side wall. The housing includes terminal cavities extending between a front and a rear of the housing. The housing includes separating walls between the terminal cavities. The poke-in terminal includes a plurality of poke-in terminals received in corresponding terminal cavities. Each poke-in terminal includes a main body extending between a mating end and a terminating end, a tab terminal socket at the mating end, and a wire socket at the terminating end. The tab terminal socket is provided at the front of the housing for receiving a corresponding tab terminal. The tab terminal socket including a top wall, a bottom wall, a first side wall, and a second side wall forming a tab terminal receptacle configured to receive the corresponding tab terminal. The tab terminal receptacle is rectangular shaped. The tab terminal socket includes upper beam contacts extending from the top wall into the tab terminal receptacle to interface with the tab terminal and lower beam contacts extending from the bottom wall into the tab terminal receptacle to interface with the tab terminal. The wire socket is provided at the rear of the housing for receiving a corresponding wire during a poke-in process. The wire socket includes walls forming a wire receptacle configured to receive the corresponding wire. The wire socket includes a first poke-in retention beam configured to interface with the wire when poked into the wire socket and a second poke-in retention beam configured to interface with the wire when poked into the wire socket. The wire socket includes a wire release element configured to be actuated to release the first and second poke-in retention beams from the wire.

In a further embodiment, an electrical connector assembly is provided. The electrical connector assembly includes a cover plate including a mounting flange configured to be mounted to a device housing of an electrical device. The cover plate includes an opening. The electrical connector assembly includes a strain relief device coupled to the cover plate at the opening of the cover plate. The strain relief device includes a bore therethrough configured to receive a power cable including a plurality of power wires including a ground wire, a hot wire and a neutral wire. The strain relief device provides strain relief for the power cable. The electrical connector assembly includes a poke-in wire connector coupled to the cover plate. The poke-in wire connector includes a housing having terminal cavities and poke-in terminals received in corresponding terminal cavities. The poke-in terminals are configured to be electrically connected to the ground wire, the hot wire and the neutral wire. The housing includes a top housing wall, a bottom housing wall, a first housing side wall, and a second housing side wall. The terminal cavities extend between a front and a rear of the housing. The housing includes separating walls between the terminal cavities. Each poke-in terminal includes a main body extending between a mating end and a terminating end, a tab terminal socket at the mating end, and a wire socket at the terminating end. The tab terminal socket provided at the front of the housing receives a corresponding tab terminal of the electrical device. The tab terminal socket includes a top wall, a bottom wall, a first side wall, and a second side wall forming a tab terminal receptacle configured to receive the corresponding tab terminal. The tab terminal socket includes upper beam contacts extending from the top wall into the tab terminal receptacle to interface with the tab terminal and lower beam contacts extending from the bottom wall into the tab terminal receptacle to interface with the tab terminal. The wire socket is provided at the rear of the housing for receiving a corresponding power wire during a poke-in process. The wire socket includes walls forming a wire receptacle configured to receive the corresponding power wire. The wire socket includes a first poke-in retention beam configured to interface with the power wire when poked into the wire socket and a second poke-in retention beam configured to interface with the power wire when poked into the wire socket, the wire socket including a wire release element configured to be actuated to release the first and second poke-in retention beams from the power wire.

DETAILED DESCRIPTION OF THE INVENTION

Figure 1:
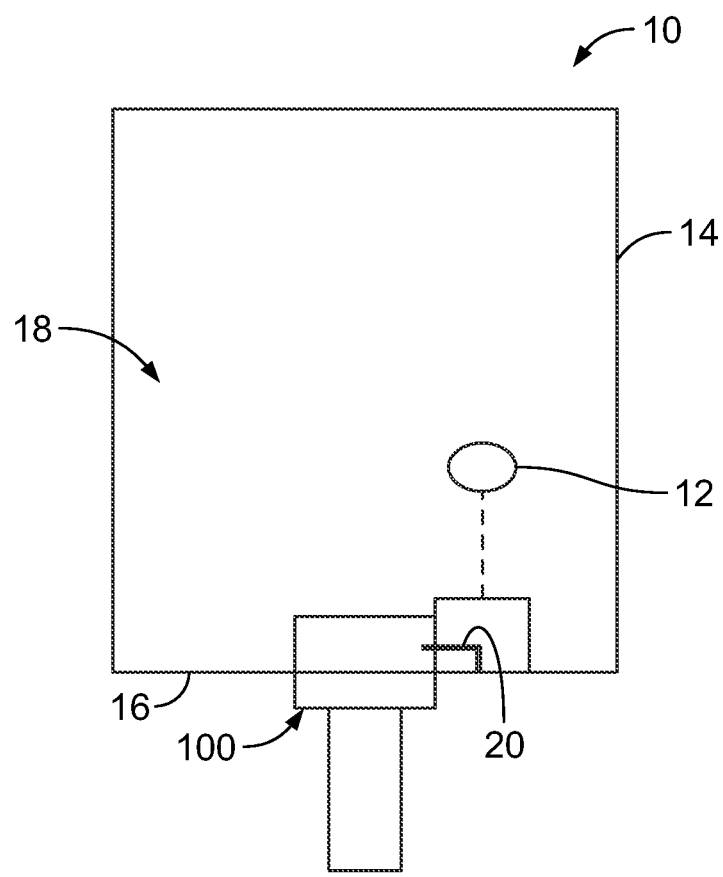
FIG. 1 is a schematic illustration of an electrical device having an electrical connector assembly in accordance with an exemplary embodiment.

FIG. 1 is a schematic illustration of an electrical device 10 having an electrical connector assembly 100 in accordance with an exemplary embodiment. In various embodiments, the electrical connector assembly 100 may be a power connector assembly used to supply power to the electrical device 10. In other various embodiments, the electrical connector assembly 100 may be a data connector used to transmit data between the electrical device 10 and another component. In various embodiments, the electrical device 10 may be an appliance, such as a home appliance. The electrical device 10 includes one or more powered components 12 that receive power from the electrical connector assembly 100. For example, the power components 12 may include motors, pumps, compressors, or other types of powered components.

The electrical device 10 includes a device housing 14 that surrounds the powered components 12. The device housing 14 includes one or more walls 16 forming a cavity 18 that houses the powered components of 12. The electrical connector assembly 100 may be mounted to one of the walls 16, such as a bottom wall of the device housing 14. In an exemplary embodiment, the electrical device 10 includes one or more tab terminals 20 within the cavity 18. The tab terminals 20 may be blade terminals, male terminals or quick disconnect terminals, such as FASTON terminals. In various embodiments, the terminals 20 are 187 series FASTON terminals having a width of 0.187 inches. Other types of terminals may be used in alternative embodiments, such as pin terminals, socket terminals, and the like. The terminals 20 may be terminated to a wire, circuit board or other electrical component of the electrical device 10. The electrical connector assembly 100 is coupled to the tab terminals 20. In an exemplary embodiment, the electrical connector assembly 100 is coupled to the tab terminals 20 at a separable interface. In an exemplary embodiment, the electrical device 10 includes three tab terminals 20, such as a ground tab terminal, a line or hot tab terminal, and a neutral tab terminal. Other types of tab terminals 20 may be provided in alternative embodiments.

Figure 2:
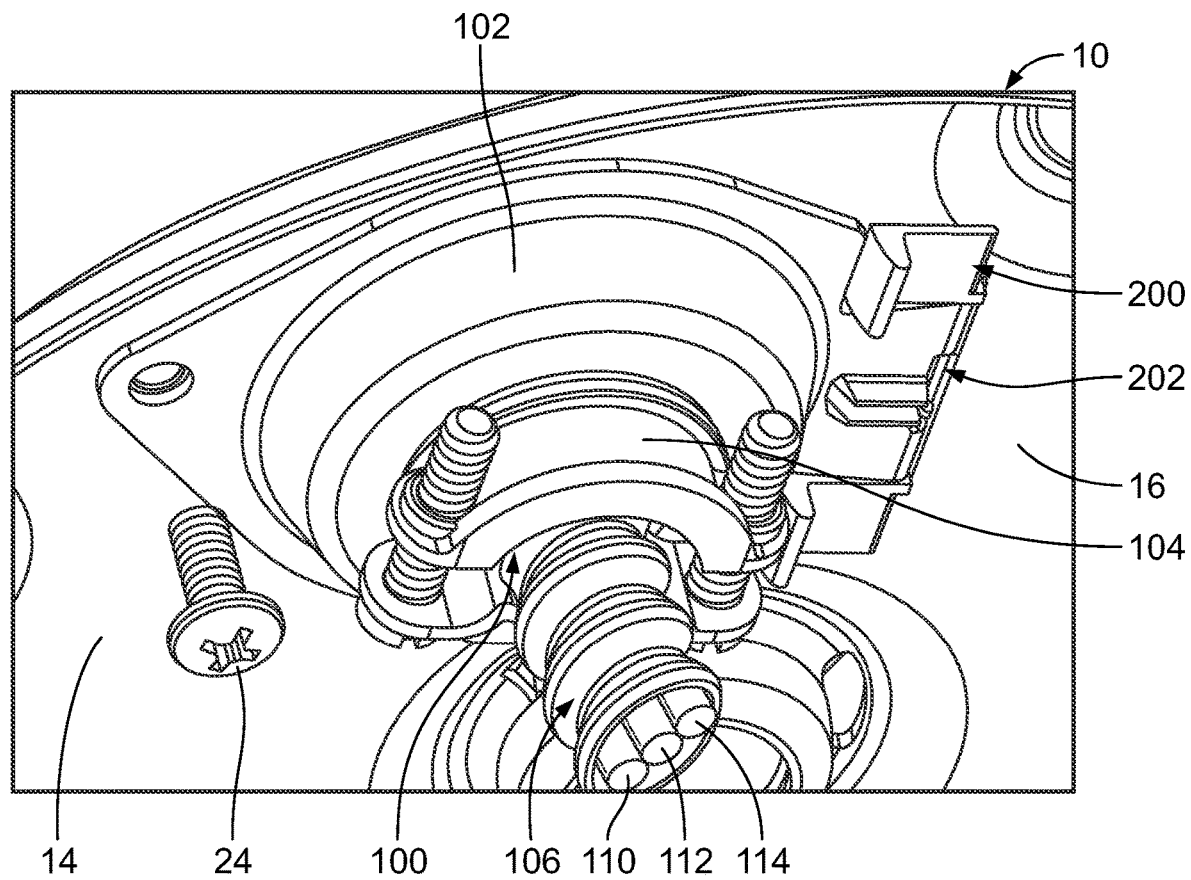
FIG. 2 is a bottom perspective view of a portion of the electrical device illustrating the electrical connector assembly coupled to a device housing of the electrical device in accordance with an exemplary embodiment.

FIG. 2 is a bottom perspective view of a portion of the electrical device 10 illustrating the electrical connector assembly 100 coupled to the device housing 14 of the electrical device 10. In an exemplary embodiment, the device housing 14 includes an opening 22 through the wall 16 that receives the electrical connector assembly 100. The electrical connector assembly 100 may be mounted to the device housing 14 from the exterior of the electrical device 10 (for example, without opening or accessing the interior of the device housing 14). As such, the electrical connector assembly 100 may be field installed to the device housing 14, such as without the need for specialized tooling and without the need for disassembly of the electrical device 10.

The electrical connector assembly 100 includes a cover plate 102 and a strain relief device 104 coupled to the cover plate 102. The cover plate 102 is coupled to the device housing 14 using one or more fasteners 24. The electrical connector assembly 100 includes a poke-in wire connector 200 coupled to the cover plate 102. The poke-in wire connector 200 is configured to be electrically connected directly to the tab terminals (shown in FIG. 1) of the electrical device 10. A power cable 106 extends through the cover plate 102 for electrical connection to the poke-in wire connector 200. The strain relief device 104 provide strain relief for the power cable 106. The strain relief device 104 may be used to mechanically coupled the power cable 106 to the cover plate 102. In an exemplary embodiment, the power cable 106 includes a conduit 108, such as a metal conduit, that surrounds and protects the power cable 106. In various embodiments, the power cable 106 is building wiring having two or three power wires providing single phase electrical power to the electrical device 10. For example, the power cable 106 may include a hot wire 110, a neutral wire 112, and a ground wire 114.

Figure 3:
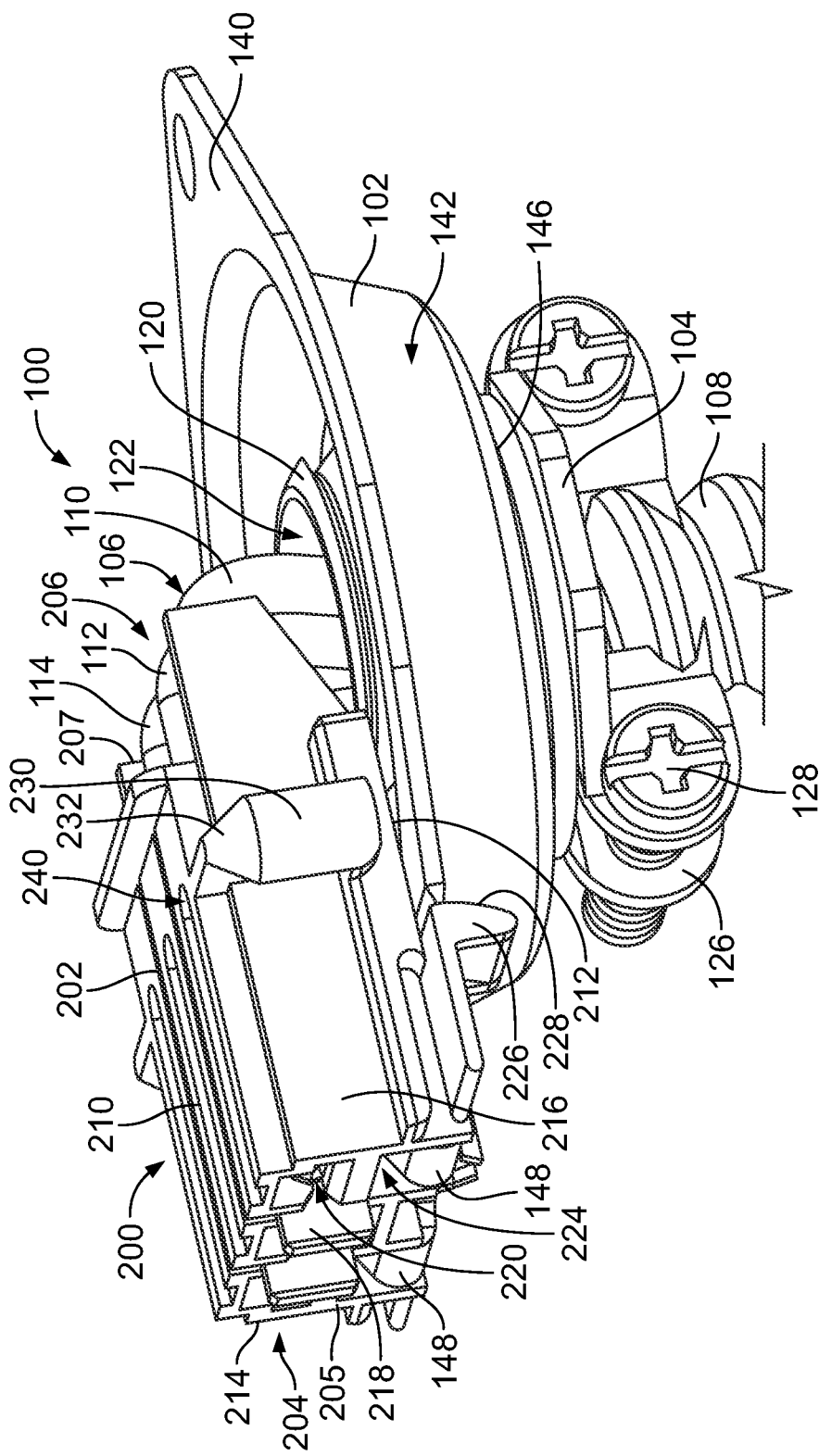
FIG. 3 is a perspective view of the electrical connector assembly in accordance with an exemplary embodiment.
Figure 4:
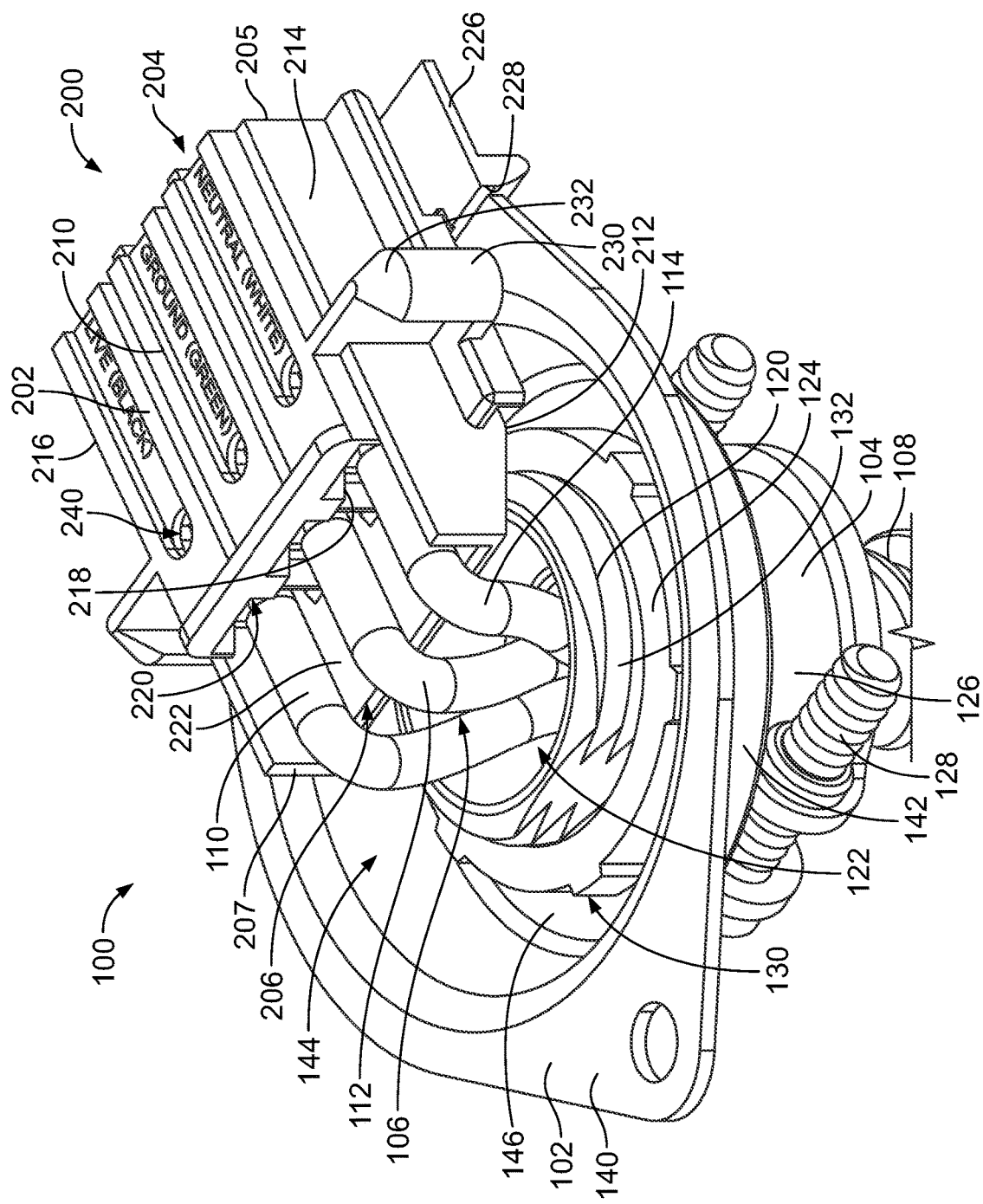
FIG. 4 is a top perspective view of the electrical connector assembly in accordance with an exemplary embodiment.

FIG. 3 is a perspective view of the electrical connector assembly 100 in accordance with an exemplary embodiment. FIG. 4 is a top perspective view of the electrical connector assembly 100 in accordance with an exemplary embodiment. The electrical connector assembly 100 includes the cover plate 102, the strain relief device 104, and the poke-in wire connector 200. The poke-in wire connector 200 is coupled to the cover plate 102. The wires 110, 112, 114 of the power cable 106 are electrically connected to the poke-in wire connector 200. For example, ends of the wires 110, 112, 114 are configured to be poked into the poke-in wire connector 200 for electrical termination to corresponding contacts of the poke-in wire connector 200. The strain relief device 104 holds the power cable 106 relative to the cover plate 102.

The strain relief device 104 includes a hub 120 having a bore 122 therethrough. The strain relief device 104 includes a nut 124 used to secure the hub 120 to the cover plate 102. The strain relief device 104 includes a clamp 126 used to secure the power cable 106 to the hub 120 and the cover plate 102. The clamp 126 may be tightened around the conduit 108 holding the power cable 106 using fasteners 128. Optionally, the clamp 126 may be a two-piece clamp having a right half and a left half secured together using fasteners 128. The fasteners 128 are tightened to secure the clamp 126 around the hub 120. In an exemplary embodiment, the hub 120 extends through an opening 130 in the cover plate 102. A portion of the hub 120 is located interior of the cover plate 102 and a portion of the hub 120 is located exterior of the cover plate 102. For example, the clamp 126 is coupled to the exterior portion of the hub 120 and the nut 124 is coupled to the interior portion of the hub 120. In an exemplary embodiment, the hub 120 is threaded and includes threads 132 along the interior portion. The nut 124 is threadably coupled to the threads 132. The power cable 106 extends through the bore 122 into the interior of the electrical connector assembly 100 for termination to the poke-in wire connector 200.

The cover plate 102 includes a mounting plate 140. The mounting plate 140 is configured to be coupled to the device housing 14 (shown in FIG. 2). In an exemplary embodiment, the poke-in wire connector 200 is coupled to the mounting plate 140. In an exemplary embodiment, the cover plate 102 includes a well 142 extending downward from the mounting plate 140. The well 142 forms a space 144 that receives the strain relief device 104. For example, the interior portion of the hub 120 and the nut 124 are received in the well 142. The opening 130 is provided in a bottom wall 146 of the well 142. The cover plate 102 may have other shapes in alternative embodiments.

Figure 5:
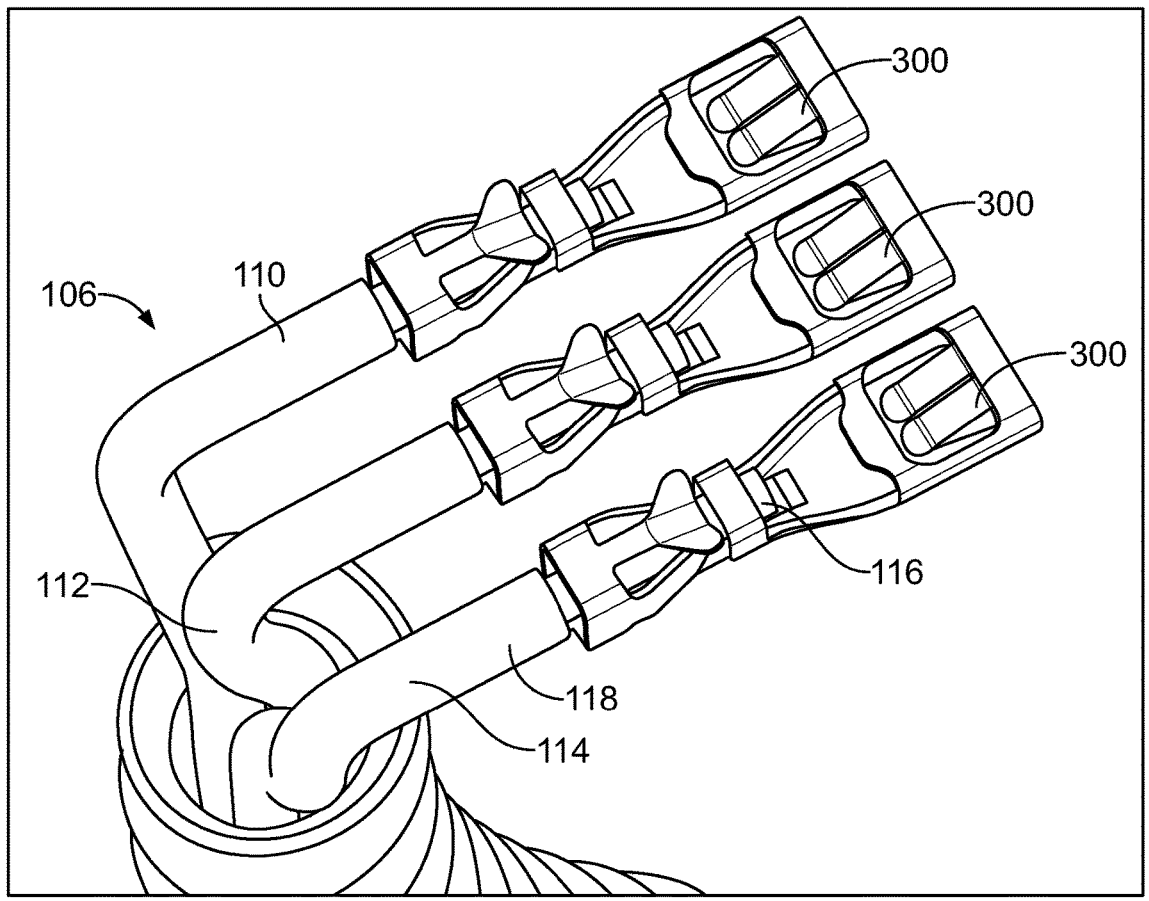
FIG. 5 illustrates a portion of a poke-in wire connector of the electrical connector assembly showing poke-in terminals terminated to ends of wires of a power cable in accordance with an exemplary embodiment.

The poke-in wire connector 200 includes a housing 202 holding a plurality of poke-in terminals 300 (shown in FIG. 5). The housing 202 is manufactured from a dielectric material, such as a plastic material. The housing 202 may be manufactured during a molding process, such as being injection molded. The housing 202 extends between a mating end 204 and a wire end 206. The wires 110, 112, 114 extend from the wire end 206. In various embodiments, the wire end 206 may be generally opposite the mating end 204. For example, the mating end 204 may be provided at a front 205 of the housing 202 and the wire end 206 may be provided at a rear 207 of the housing 202. In alternative embodiments, the housing 202 may be a right-angle housing having the mating end 204 perpendicular to the wire end 206.

The housing 202 includes a top housing wall 210, a bottom housing wall 212, a first housing side wall 214, and a second housing side wall 216. In an exemplary embodiment, the housing 202 includes separating walls 218 extending between the top housing wall 210 and the bottom housing wall 212. The separating walls 218 extend between the mating end 204 and the wire end 206 to form cavities 220 that receive corresponding poke-in terminals 300. The separating walls 218 electrically isolate the poke-in terminals 300. The separating walls 218 may be oriented generally parallel to the first and second housing side walls 214, 216. In various embodiments, front and rear ends of the separating walls 218 may be chamfered to provide a lead-in surfaces for loading the wires 110, 112, 114 into the cavities 220 and/or to guide the tab terminals 20 (shown in FIG. 1) into the cavities 220.

In an exemplary embodiment, the housing 202 includes a platform 222 at the rear 207 of the housing 202. The platform 222 supports the wires 110, 112, 114 rearward of the cavities 220. The platform 222 may be defined by a rear portion of the bottom housing wall 212. Portions of the first and second housing side walls 214, 216 may extend along the platform 222 two contain the wires 110, 112, 114. The platform 222 provides access to the cavities 220.

In an exemplary embodiment, the housing 202 includes pockets 224 at the front 205 of the housing 202. The pockets 224 receive mounting tabs 148 of the cover plate 102. The mounting tabs 148 are used to locate and secure the poke-in wire connector 200 to the cover plate 102. The mounting tabs 148 may extend from the front of the mounting plate 140. In the illustrated embodiment, the mounting tabs 148 are bent or folded over to form hooks that extend into the pockets 224 of the housing 202 to secure the housing 202 to the cover plate 102. In an exemplary embodiment, the housing 202 includes latches 226 used to secure the housing 202 to the cover plate 102. In the illustrated embodiment, the latches 226 are provided at the first and second housing side walls 214, 216. The latches 226 are provided proximate to the front 205. The latches 226 may be deflectable relative to the housing 202 to latchably couple the housing 202 to the cover plate 102. In an exemplary embodiment, each latch 226 includes a blocking surface 228 configured to engage the cover plate 102 and retain the housing 202 on the cover plate 102. For example, the blocking surface 228 may prevent rearward movement of the housing 202 relative to the cover plate 102.

In an exemplary embodiment, the housing 202 includes guide pins 230 used to guide mating of the poke-in wire connector 200 to the device housing 14 of the electrical device 10 (shown in FIG. 2). In the illustrated embodiment, the guide pins 230 are provided at the first and second housing side walls 214, 216. The guide pins 230 are located approximately centered between the front 205 and the rear 207. The guide pins 230 may be provided at other locations in alternative embodiments. In an exemplary embodiment, the guide pins 230 have a curved outer surface (for example, semi-cylindrical shaped). However, the guide pins 230 may have other shapes in alternative embodiments. Optionally, top ends of the guide pins 230 may include lead-in surfaces 232. For example, the top end of the guide pins 230 may be cone shaped. The lead in surfaces 232 guide mating of the guide pins 230 with the device housing 14.

In an exemplary embodiment, the housing 202 includes release openings 240 in the top housing wall 210. The release openings 240 provide access to the poke-in terminals 300. The release openings 240 are configured to receive a released tool used to release the wires 110, 112, 114 from the poke-in terminals 300. For example, a screwdriver or other tool may be pushed into the cavities 220 to interface with the poke-in terminals 300 and release the wires 110, 112, 114 from the poke-in terminals 300.

FIG. 5 illustrates a portion of the poke-in wire connector 200 showing the poke-in terminals 300 terminated to ends of the wires 110, 112, 114 of the power cable 106. The ends of the wires 110, 112, 114 are configured to be poked into the poke-in terminals 300 to make a quick and reliable electrical connection between the poke-in terminals 300 and the wires 110, 112, 114. In an exemplary embodiment, the termination between the wires 110, 112, 114 and the poke-in terminals 300 is a separable termination allowing the wires 110, 112, 114 to be released from the poke-in terminals 300, such as for repair/replacement of the power cable 106 or repair/replacement of the poke-in wire connector 200.

Each wire 110, 112, 114 includes a conductor 116 and an insulator 118 surrounding the conductor 116. The end of the insulator 118 may be removed to expose the end of the conductor 116. The end of the conductor 116 is configured to be poked into the corresponding poke-in terminal 300. Optionally, the wires 110, 112, 114 may be bundled together within a cable jacket (not shown).

In the illustrated embodiment, the power cable 106 includes the three wires, namely the hot wire 110, the neutral wire 112, and the ground wire 114. Three of the poke-in terminals 300 are similarly provided and terminated to the corresponding wires 110, 112, 114. The poke-in terminals 300 are configured to be received in the housing 202 (shown in FIGS. 3 and 4). In an exemplary embodiment, the poke-in terminals 300 are located in the housing 202 prior to the wires 110, 112, 114 being terminated to the poke-in terminals 300. Optionally, the poke-in terminals 300 may be identical; however, the poke-in terminals 300 may have different features in alternative embodiments.

Figure 6:
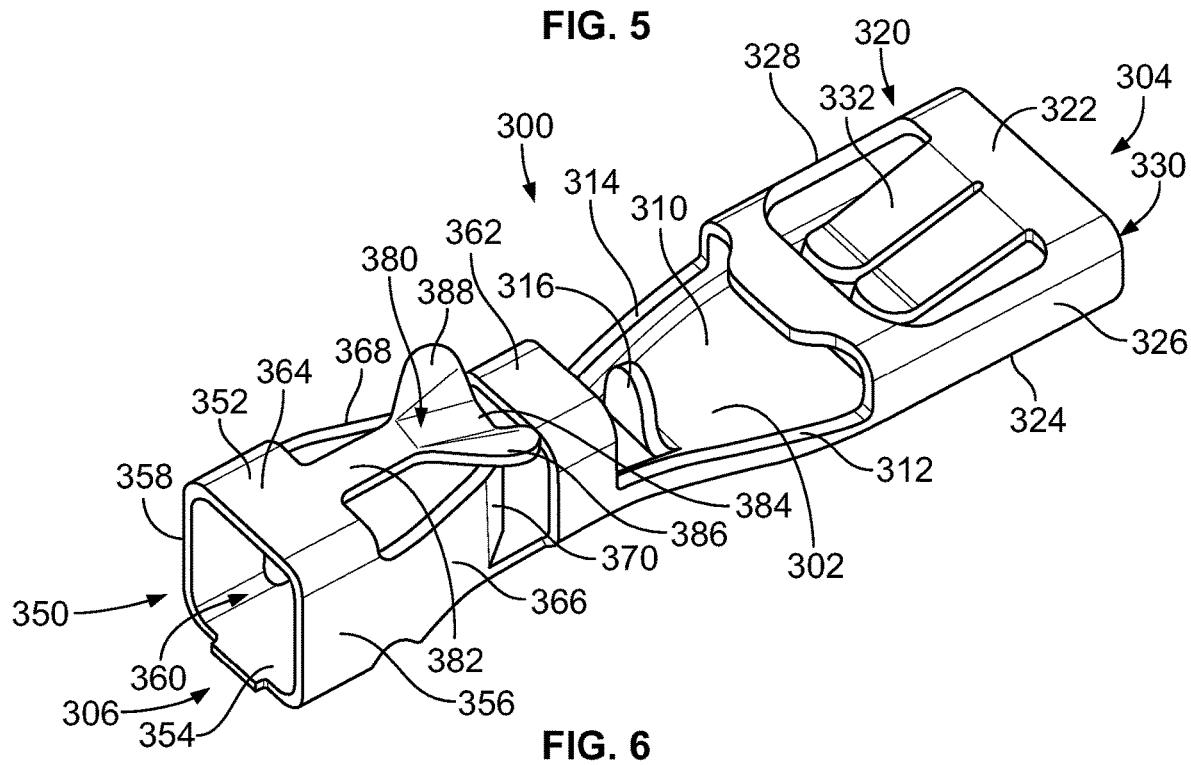
FIG. 6 is a top, rear perspective view of the poke-in terminal in accordance with an exemplary embodiment.
Figure 7:
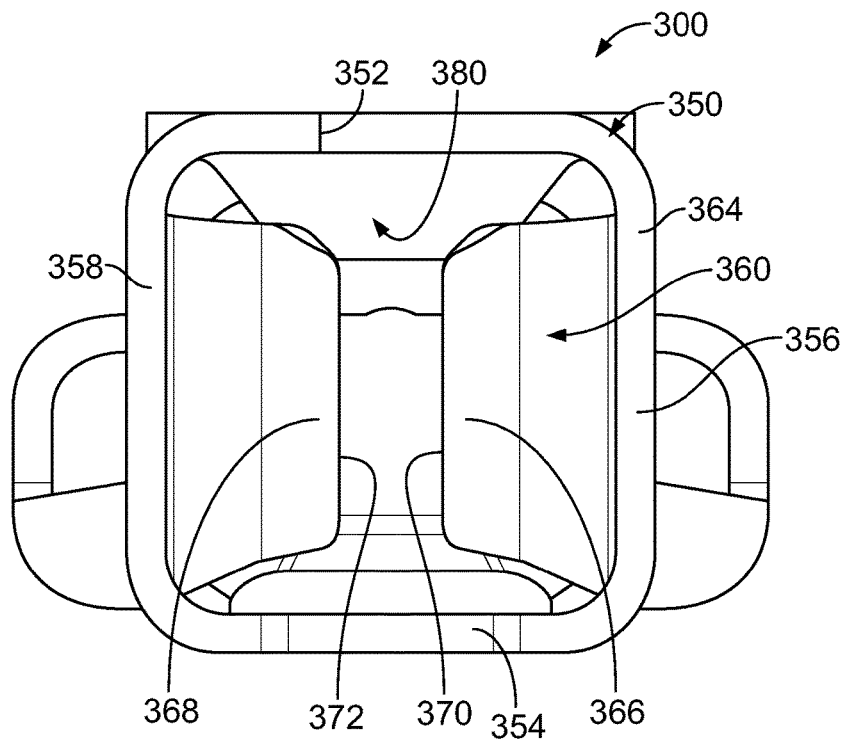
FIG. 7 is a rear end view of the poke-in terminal in accordance with an exemplary embodiment.
Figure 8:
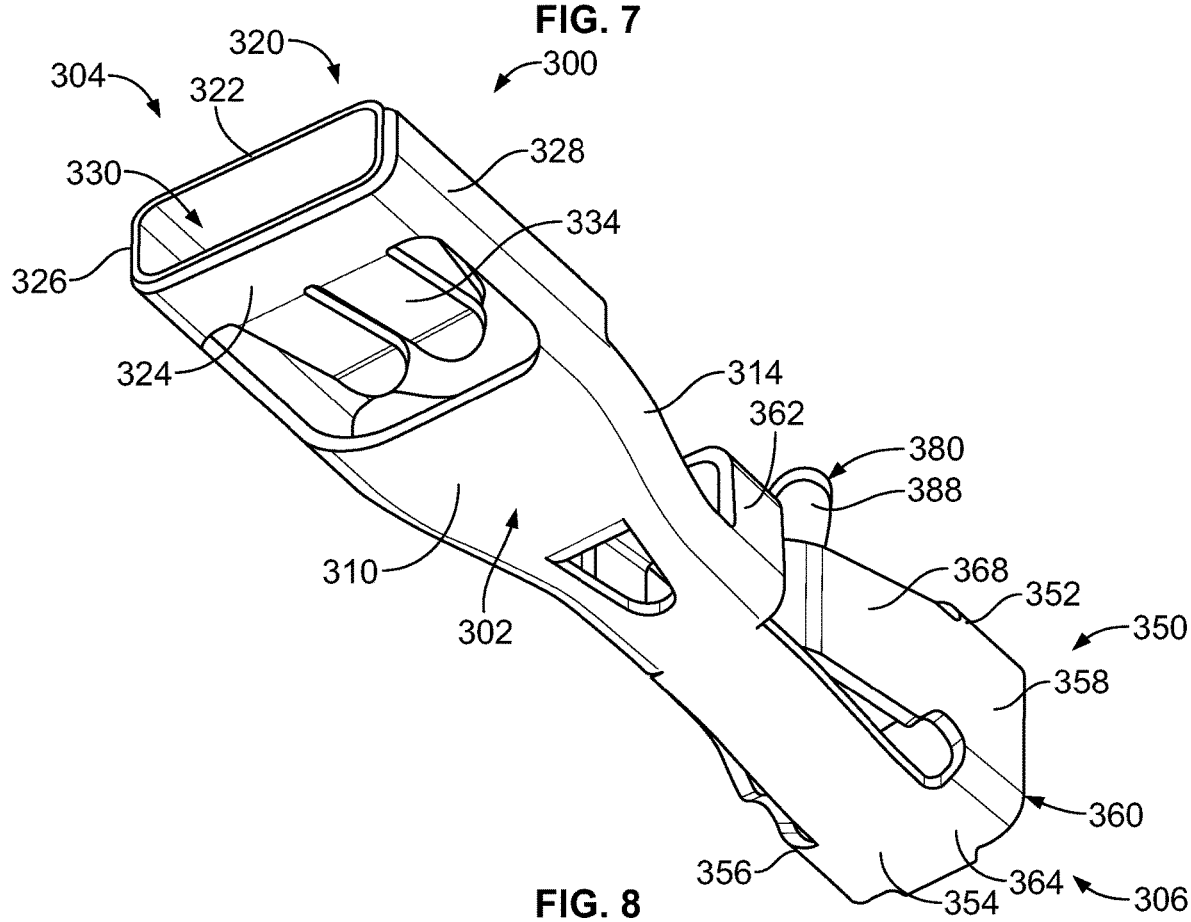
FIG. 8 is a bottom, front perspective view of the poke-in terminal in accordance with an exemplary embodiment.

FIG. 6 is a top, rear perspective view of the poke-in terminal 300 in accordance with an exemplary embodiment. FIG. 7 is a rear end view of the poke-in terminal 300 in accordance with an exemplary embodiment. FIG. 8 is a bottom, front perspective view of the poke-in terminal 300 in accordance with an exemplary embodiment.

In an exemplary embodiment, the poke-in terminal 300 is manufactured from a metal material, such as copper, aluminum, stainless steel, and the like. The poke-in terminal 300 may be stamped and formed from a metal sheet. For example, features of the poke-in terminal 300 may be stamped from the metal sheet and then the features are bent into a predetermined shape. The poke-in terminal 300 includes a main body 302 extending between a mating end 304 and a terminating end 306 of the poke-in terminal 300. Optionally, the mating end 304 may be opposite the terminating end 306. For example, the mating end 304 may be provided at a front of the poke-in terminal 300 and the terminating end 306 may be provided at a rear of the poke-in terminal 300. In alternative embodiments, the poke-in terminal 300 may be a right-angle terminal having the mating end 304 perpendicular to the terminating end 306. The mating end 304 and the terminating end 306 may be at other (non-parallel and non-perpendicular) orientations in alternative embodiments. The poke-in terminal 300 includes a tab terminal socket 320 at the mating end 304 and a wire socket 350 at the terminating end 306. The tab terminal socket 320 is configured to receive one of the tab terminals 20 (shown in FIG. 1) during a mating process with the electrical device 10. The wire socket 350 is configured to receive one of the wires 110, 112, 114 (shown in FIG. 5) during a wire poke-in process.

The main body 302 includes a bottom plate 310 and side walls 312, 314 extending from the bottom plate 310. The side walls 312, 314 provide rigidity and structural strength to the main body 302 of the poke-in terminal 300. Optionally, the bottom plate 310 and the side walls 312, 314 may be flared outward between the wire socket 350 in the tab terminal socket 320. In an exemplary embodiment, the main body 302 includes a stop feature 316 forward of the wire socket 350. The stop feature 316 is used to stop loading of the wire 110, 112, 114 into the wire socket 350 to position the wire 110, 112, 114 in the wire socket 350. In the illustrated embodiment, the stop feature 316 is stamped from the bottom plate 310 and bent upward such that the stop feature 316 is positioned forward of the wire socket 350. In the illustrated embodiment, the top of the main body 302 is open between the side walls 312, 314. However, in alternative embodiments, the main body 302 may include a top wall extending between the side walls 312, 314.

The tab terminal socket 320 is provided at the mating end 304 for mating with the tab terminal 20. The tab terminal socket 320 includes a plurality of walls, such as four walls forming a tab terminal receptacle 330. In the illustrated embodiment, the plurality of walls includes a first or top wall 322, a second or bottom wall 324, a third or first side wall 326, and a fourth or second side wall 328 forming the tab terminal receptacle 330. The tab terminal socket 320 may be oriented in other orientations such that any of the other walls 324, 326, 328 may define a top wall or none of the walls may be a top wall (for example, the tab terminal receptacle 330 may be open at a top of the tab terminal socket 320). The tab terminal receptacle 330 receives the tab terminal 20. The bottom wall 324 may be generally co-planer with the bottom plate 310 of the main body 302. The first and second side walls 326, 328 transition into the side walls 312, 314 of the main body 302. Optionally, the first and second side walls 326, 328 may be taller than the side walls 312, 314. The walls 322, 324, 326, 328 of the tab terminal socket 320 surrounds the tab terminal receptacle 330 on four sides. The tab terminal receptacle 330 is sized and shaped to receive the tab terminal 20. For example, the tab terminal receptacle 330 may be rectangular shaped having a width approximately equal to the width of the tab terminal 20 and a height approximately equal to the height of the tab terminal 20. In the illustrated embodiment, the tab terminal receptacle 330 is short and wide having a width greater than a height thereof. In various embodiments, the width of the tab terminal receptacle 330 may be at least twice the height of the tab terminal receptacle 330.

The tab terminal socket 320 includes upper beam contacts 332 extending from the top wall 322 into the tab terminal receptacle 330 to interface with the tab terminal 20. In the illustrated embodiment, the tab terminal socket 320 includes a pair of the upper beam contacts 332; however, the tab terminal socket 320 may include greater or fewer upper beam contacts 332 in alternative embodiments. The tab terminal socket 320 includes lower beam contacts 334 extending from the bottom wall 324 into the tab terminal receptacle 330 to interface with the tab terminal 20. In the illustrated embodiment, the tab terminal socket 320 includes a pair of the lower beam contacts 334; however, the tab terminal socket 320 may include greater or fewer lower beam contacts 334 in alternative embodiments. In an exemplary embodiment, the upper and lower beam contacts 332, 334 are cantilevered beams angled inward into the tab terminal receptacle 330 to interface with the tab terminal 20. Optionally, the upper and lower beam contacts 332, 334 are fixed at forward ends of the upper and lower beam contacts 332, 334 such that the upper and lower beam contacts 332, 334 extend rearwardly into the tab terminal receptacle 330. The upper and lower beam contacts 332, 334 have mating interfaces proximate to distal ends of the upper and lower beam contacts 332, 334. Optionally, the mating interfaces may be aligned with each other on opposite sides of the tab terminal receptacle 330. Alternatively, the mating interfaces may be offset relative to each other, which may reduce tab insertion forces into the tab terminal socket 320. The upper and lower beam contacts 332, 334 are deflectable when mated with the tab terminal 20. For example, the upper and lower beam contacts 332, 334 may be deflected in an outward direction (for example, the upper beam contacts 332 are deflected upward and the lower beam contacts 334 are deflected downward). The plurality of upper and lower beam contacts 332, 334 provide multiple points of contact between the tab terminal socket 320 and the tab terminal 20.

The wire socket 350 is provided at the terminating end 306. The wire socket 350 includes a plurality of walls, such as four walls, forming a wire receptacle 360. In the illustrated embodiment, the wire socket 350 includes a first or top wall 352, a second or bottom wall 354, a third or first side wall 356, and fourth or a second side wall 358 forming a wire receptacle 360 configured to receive the corresponding power wire 110, 112, 114. The wire socket 350 may be oriented in other orientations such that any of the other walls 354, 356, 358 may define a top wall or none of the walls may be a top wall (for example, the wire receptacle 360 may be open at a top of the wire socket 350). In the illustrated orientation, the bottom wall 354 transitions from the bottom plate 310 of the main body 302. Optionally, the bottom wall 354 may be generally coplanar with the bottom plate 310. Alternatively, the bottom wall 354 may transition downward relative to the bottom plate 310 such that the bottom wall 354 is located below the bottom plate 310. The first and second side walls 356, 358 transition into the side walls 312, 314 of the main body 302. Optionally, the first and second side walls 356, 358 may be taller than the side walls 312, 314.

The wire receptacle 360 is sized and shaped to receive the corresponding power wire 110, 112, 114. For example, the wire receptacle 360 may be square shaped having a width and a height approximately equal to, or slightly wider than, a diameter of the wire 110, 112, 114 to center the wire 110, 112, 114 in the wire receptacle 360. In the illustrated embodiment, the wire receptacle 360 is taller than the tab terminal receptacle 330 while the tab terminal receptacle 330 is wider than the wire receptacle 360. In an exemplary embodiment, the wire socket 350 includes a front box 362 and a rear box 364 rearward of the front box 362. The rear box 364 is spaced apart from the front box 362. The front box 362 is defined by the walls 352, 354, 356, 358. The front box 362 surrounds the wire receptacle 360 on four sides. The rear box 364 is defined by the walls 352, 354, 356, 358. The rear box 364 surrounds the wire receptacle 360 on four sides.

The wire socket 350 includes a first poke-in retention beam 366 configured to interface with the power wire 110, 112, 114 when poked into the wire socket 350. The first poke-in retention beam 366 is provided at the first side wall 356. The first poke-in retention beam 366 is located between the front box 362 and the rear box 364. In the illustrated embodiment, the first poke-in retention beam 366 extends from the rear box 364 toward the front box 362. The first poke-in retention beam 366 is angled inward into the wire receptacle 360 to interface with the power wire 110, 112, 114. The wire socket 350 includes a second poke-in retention beam 368 configured to interface with the power wire 110, 112, 114 when poked into the wire socket 350. The second poke-in retention beam 368 is provided at the second side wall 358. The second poke-in retention beam 368 is located between the front box 362 and the rear box 364. In the illustrated embodiment, the second poke-in retention beam 368 extends from the rear box 364 toward the front box 362. The second poke-in retention beam 368 is angled inward into the wire receptacle 360 to interface with the power wire 110, 112, 114. The wire socket 350 may include greater or fewer poke-in retention beams in alternative embodiments.

In an exemplary embodiment, the first and second poke-in retention beams 366, 368 are cantilevered beams angled inward into the wire receptacle 360 to interface with the corresponding wire 110, 112, 114. Optionally, the first and second poke-in retention beams 366, 368 are fixed at rear ends of the first and second poke-in retention beams 366, 368 such that the first and second poke-in retention beams 366, 368 extend forwardly into the wire receptacle 360. The first and second poke-in retention beams 366, 368 have edges 370, 372, respectively, at distal ends of the first and second poke-in retention beams 366, 368 configured to retain the wire 110, 112, 114 in the wire socket 350. For example, the edges 370, 372 may dig into the wire 110, 112, 114 to resist pullout of the wire 110, 112, 114 from the wire socket 350. Optionally, the edges 370, 372 may be aligned with each other on opposite sides of the wire receptacle 360 to pinch the wire 110, 112, 114 therebetween. Alternatively, the edges 370, 372 may be offset relative to each other and force the wire 110, 112, 114 to bend or kink around the first and second poke-in retention beams 366, 368, which may increase the retention force to hold the wire 110, 112, 114 in the wire socket 350. The first and second poke-in retention beams 366, 368 are deflectable when mated with the wire 110, 112, 114. For example, the first and second poke-in retention beams 366, 368 may be deflected in an outward direction. The first and second poke-in retention beams 366, 368 provide multiple points of contact between the wire socket 350 and the corresponding wire 110, 112, 114.

The wire socket 350 includes a wire release element 380 configured to be actuated to release the first and second poke-in retention beams 366, 368 from the power wire 110, 112, 114. For example, the wire release element 380 may be pressed downward into the wire receptacle 360 to force the first and second poke-in retention beams 366, 368 outward away from the power wire 110, 112, 114. The wire release element 380 is located between the front box 362 and the rear box 364. In an exemplary embodiment, the wire release element 380 is a cantilevered beam angled inward into the wire receptacle 360 to interface with the first and second poke-in retention beams 366, 368. Optionally, the wire release element 380 is fixed at the rear end thereof and extends forwardly into the wire receptacle 360. In the illustrated embodiment, the wire release element 380 is provided along the top wall 352 of the wire socket 350. The wire release element 380 is deflectable into the wire receptacle 360 to interface with the first and second poke-in retention beams 366, 368.

In an exemplary embodiment, the wire release element 380 includes a main beam 382 extending from the rear box 364 to a free end 384. The wire release element 380 includes a first deflecting tab 386 extending from the main beam 382 at the free end 384 to engage the first poke-in retention beam 366. The wire release element 380 includes a second deflecting tab 388 extending from the main beam 382 at the free end 384 to engage the second poke-in retention beam 368. The first and second deflecting tabs 386, 388 are flared upward nonparallel to the main beam 382 to interface with and deflect the first and second poke-in retention beams 366, 368 outward as the wire release element 380 is actuated.

Figure 9:
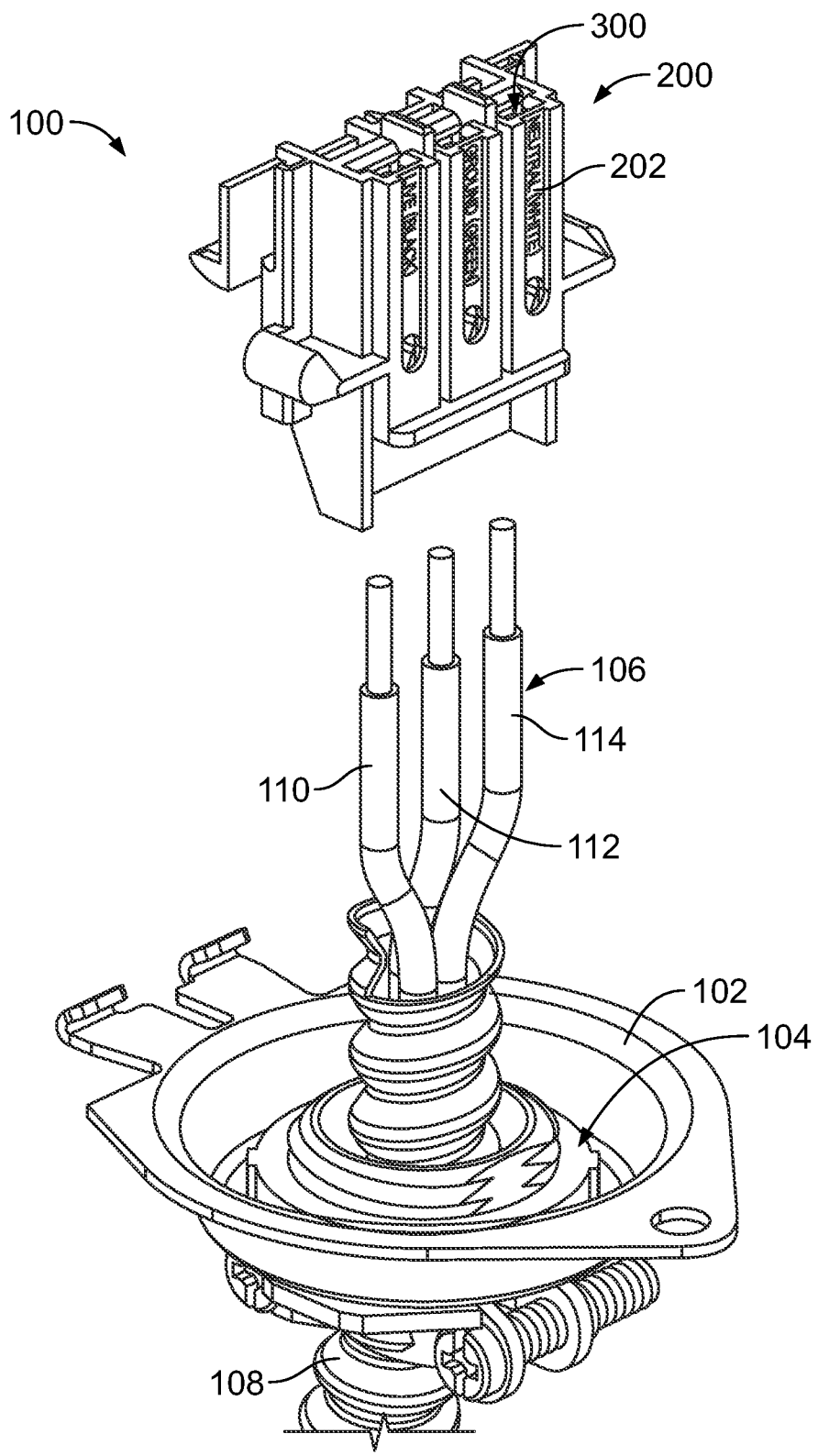
FIG. 9 illustrates the electrical connector assembly in a partially assembled state in accordance with an exemplary embodiment.
Figure 10:
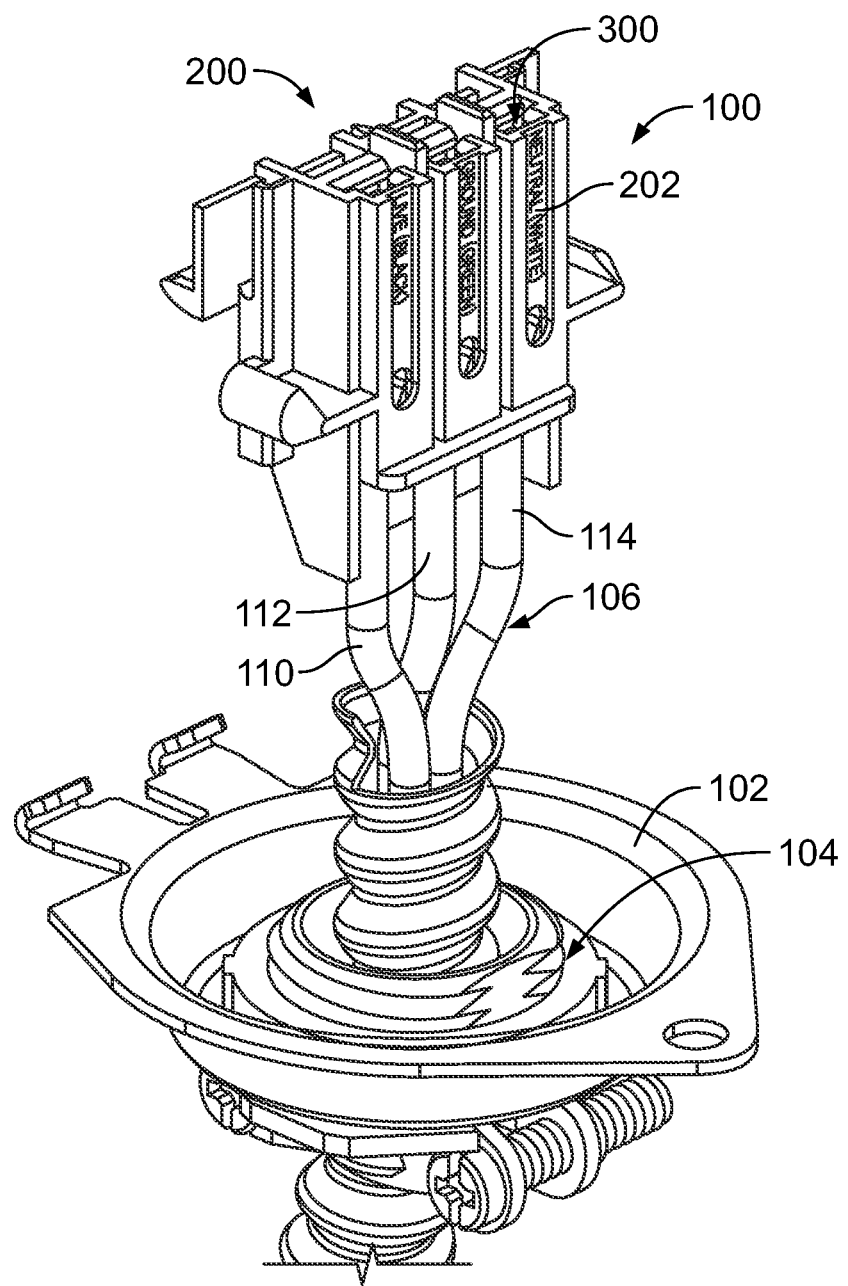
FIG. 10 illustrates the electrical connector assembly in a partially assembled state in accordance with an exemplary embodiment.

FIG. 9 illustrates the electrical connector assembly 100 in a partially assembled state. FIG. 10 illustrates the electrical connector assembly 100 in a partially assembled state. FIG. 9 illustrates the poke-in wire connector 200 poised for coupling with the power cable 106. FIG. 10 illustrates the poke-in wire connector 200 coupled to the power cable 106.

During assembly, the poke-in terminals 300 (shown in FIG. 6) are received in the housing 202. The individual wires 110, 112, 114 may be poked into the poke-in wire connector 200 to electrically connect to the corresponding poke-in terminals 300. Optionally, the cover plate 102 and the strain relief device 104 may be loosely coupled to the power cable 106 (for example, loosely coupled to the conduit 108) to allow a usable length of the power cable 106 to be pulled through the cover plate 102 and the strain relief device 104 for termination to the poke-in wire connector 200. After the wires one, 112, 114 are poked into the poke-in terminals 300 in the housing 202, the poke-in wire connector 200 may be coupled to the cover plate 102.

Figure 11:
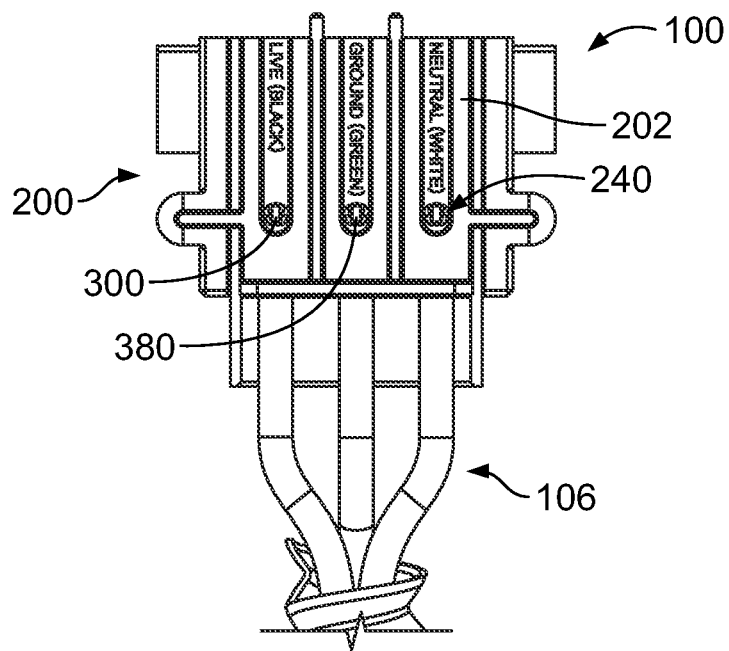
FIG. 11 illustrates a portion of the electrical connector assembly showing the poke-in wire connector coupled to the power cable in accordance with an exemplary embodiment.
Figure 12:
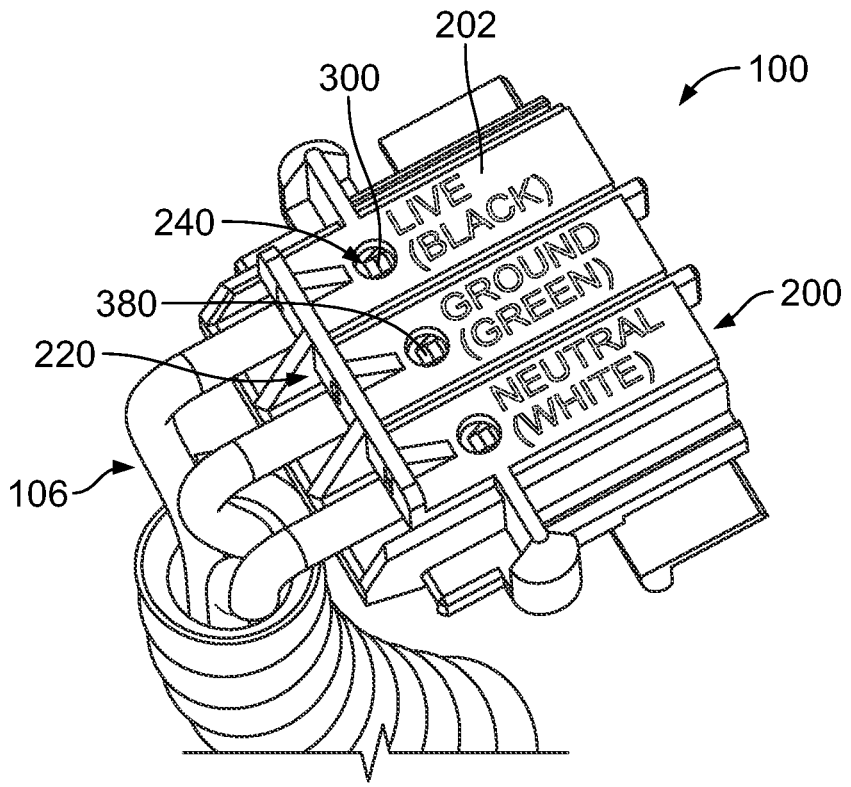
FIG. 12 is a perspective view of a portion of the electrical connector assembly showing the poke-in wire connector coupled to the power cable in accordance with an exemplary embodiment.

FIG. 11 illustrates a portion of the electrical connector assembly 100 showing the poke-in wire connector 200 coupled to the power cable 106. FIG. 12 is a perspective view of a portion of the electrical connector assembly 100 showing the poke-in wire connector 200 coupled to the power cable 106. When assembled, the poke-in terminals 300 are received in corresponding cavities 220 of the housing 202. The release openings 240 in the housing 202 are aligned with the wire release elements 380 (shown in FIG. 6) to release the wires one, 112, 114 from the poke-in terminals 300 should the need arise. A tool may be inserted into the release openings 240 to actuate the wire release elements 380.

Figure 13:
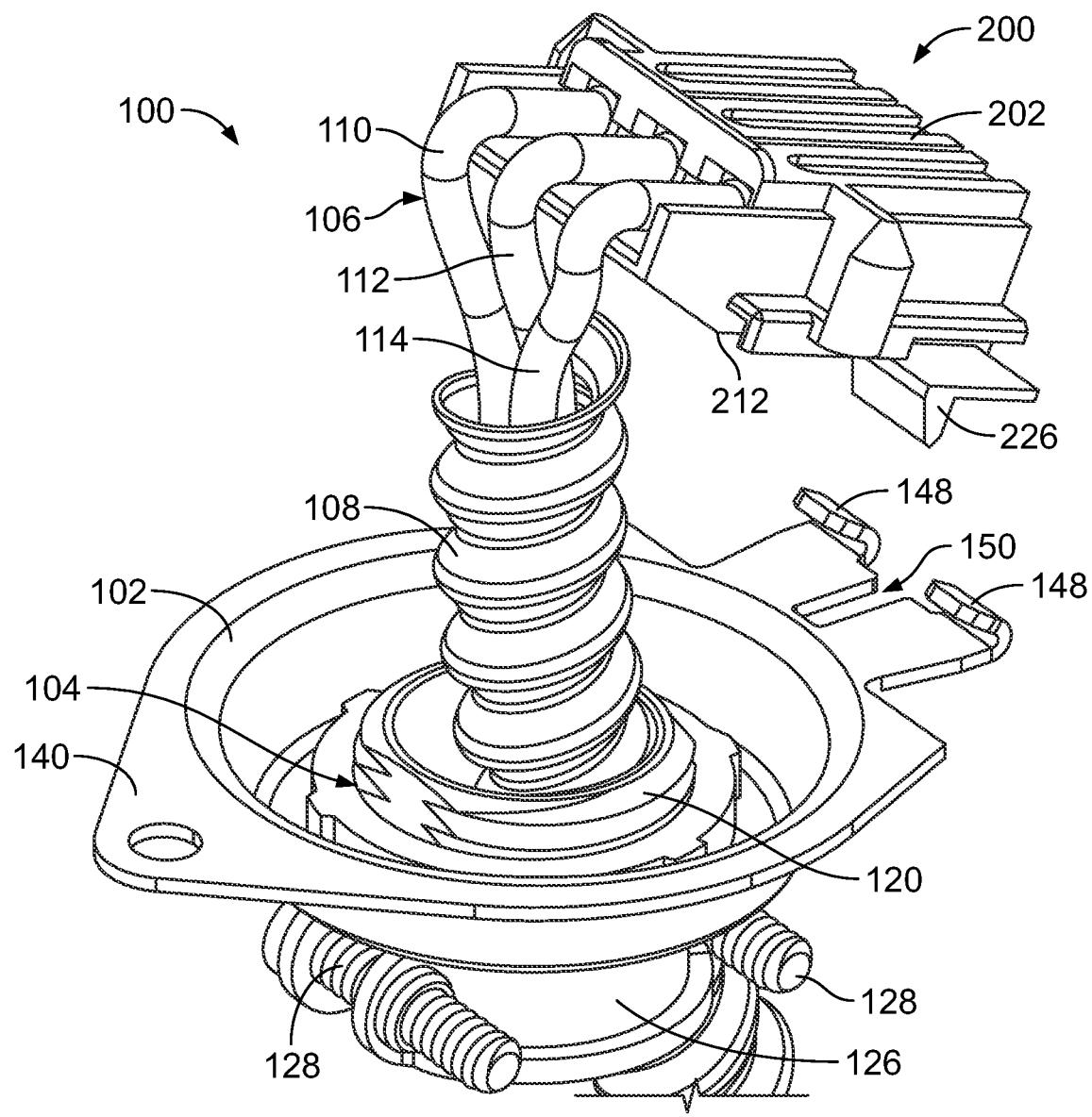
FIG. 13 illustrates the electrical connector assembly showing the poke-in wire connector poised for coupling to a cover plate in accordance with an exemplary embodiment.
Figure 14:
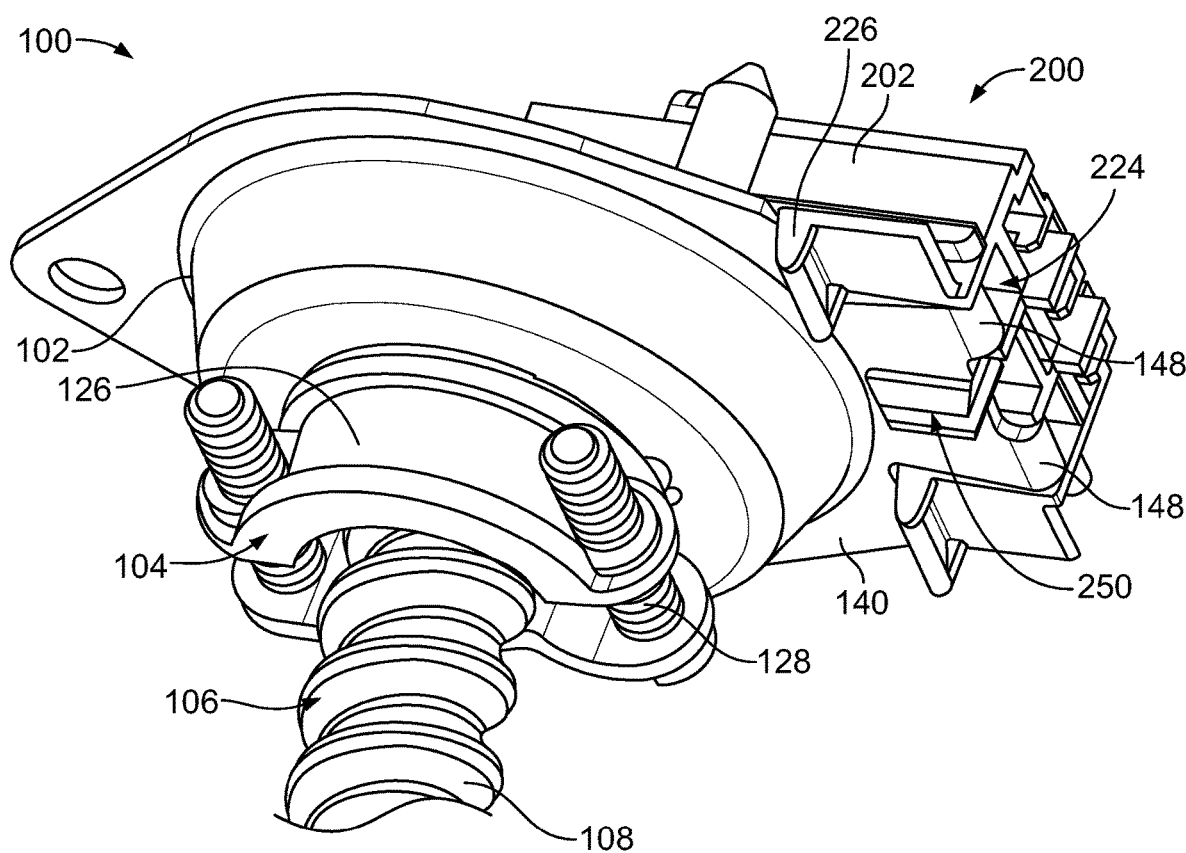
FIG. 14 illustrates the electrical connector assembly showing the poke-in wire connector coupled to the cover plate in accordance with an exemplary embodiment.

FIG. 13 illustrates the electrical connector assembly 100 showing the poke-in wire connector 200 poised for coupling to the cover plate 102. FIG. 14 illustrates the electrical connector assembly 100 showing the poke-in wire connector 200 coupled to the cover plate 102. During assembly, the housing 202 is coupled to the mounting plate 140 of the cover plate 102. The wires 110, 112, 114 are flexible to allow the housing 202 to position relative to the cover plate 102. Because the strain relief device 104 is loosely coupled to the power cable 106, the power cable 106 may be pressed downward through the hub 120 of the strain relief device 104 as the housing 202 is positioned relative to the cover plate 102.

During assembly, the mounting tabs 148 are aligned with the pockets 224 of the housing 202. The housing 202 is coupled to the cover plate 102 by loading the mounting tabs 148 into the pockets 224. The housing 202 may be seated against the mounting plate 140. During assembly, the latches 226 are latchably coupled to the mounting plate 140. The latches 226 secure the housing 202 on the cover plate 102. The latches 226 prevent rearward movement of the housing 202 relative to the mounting plate 140. The mounting tabs 148 event forward movement and side to side movement of the housing 202 relative to the mounting plate 140. In an exemplary embodiment, the housing 202 includes central latches 250 extending from the bottom housing wall 212. The central latches 250 are received in a slot 150 between the mounting tabs 148. The central latches 250 secure the housing 202 to the cover plate 102. The central latches 250 prevent liftoff of the housing 202 from the cover plate 102.

After the poke-in wire connector 200 is coupled to the cover plate 102, the strain relief device 104 may be fully coupled to the power cable 106. For example, the fasteners 128 may be tightened to secure the clamp 126 around the conduit 108. When the strain relief device 104 is clamped onto the conduit 108, the conduit 108 and the power cable 106 are fixed relative to the strain relief device 104, the cover plate 102, and the poke-in wire connector 200.

Figure 15:
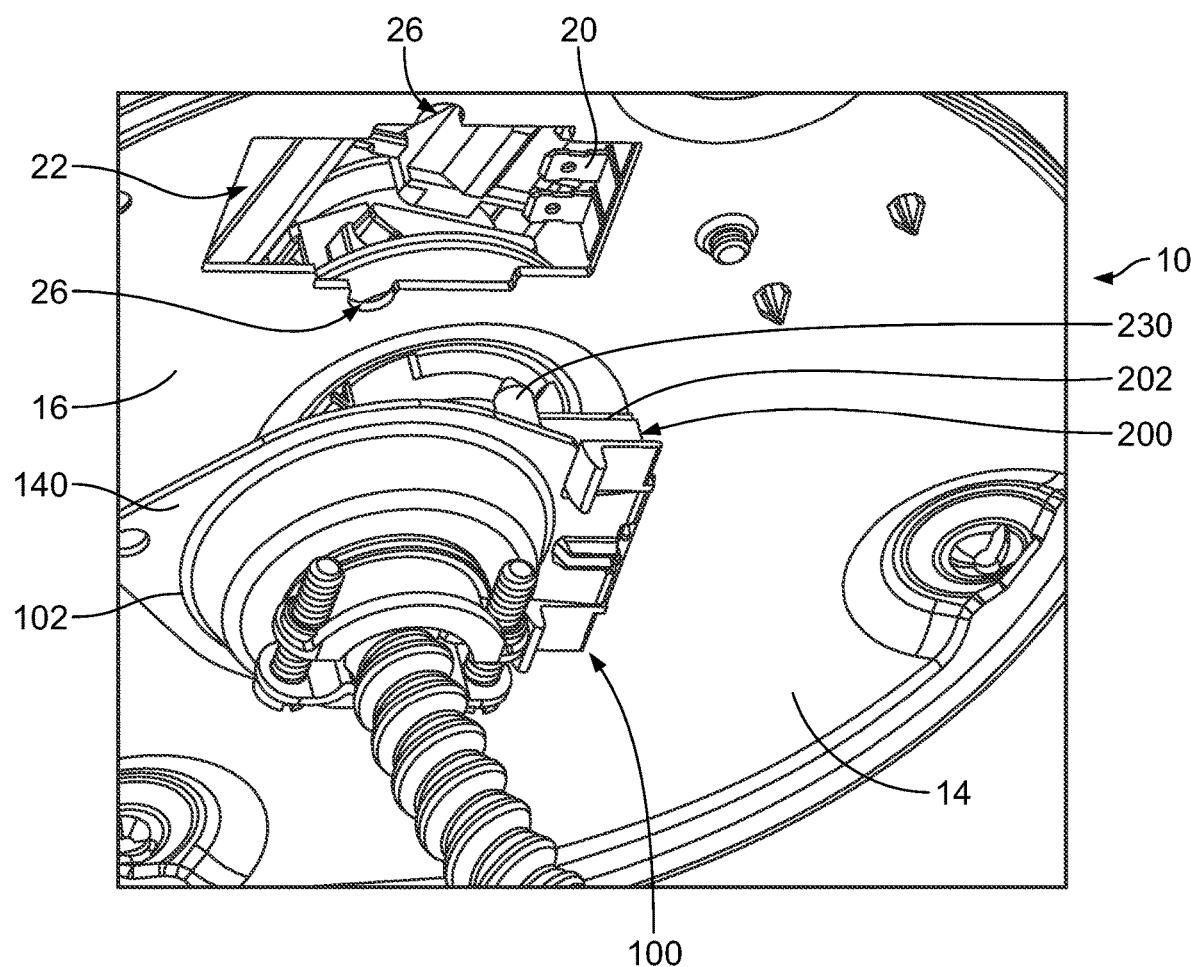
FIG. 15 illustrates the electrical connector assembly poised for coupling to the electrical device in accordance with an exemplary embodiment.
Figure 16:
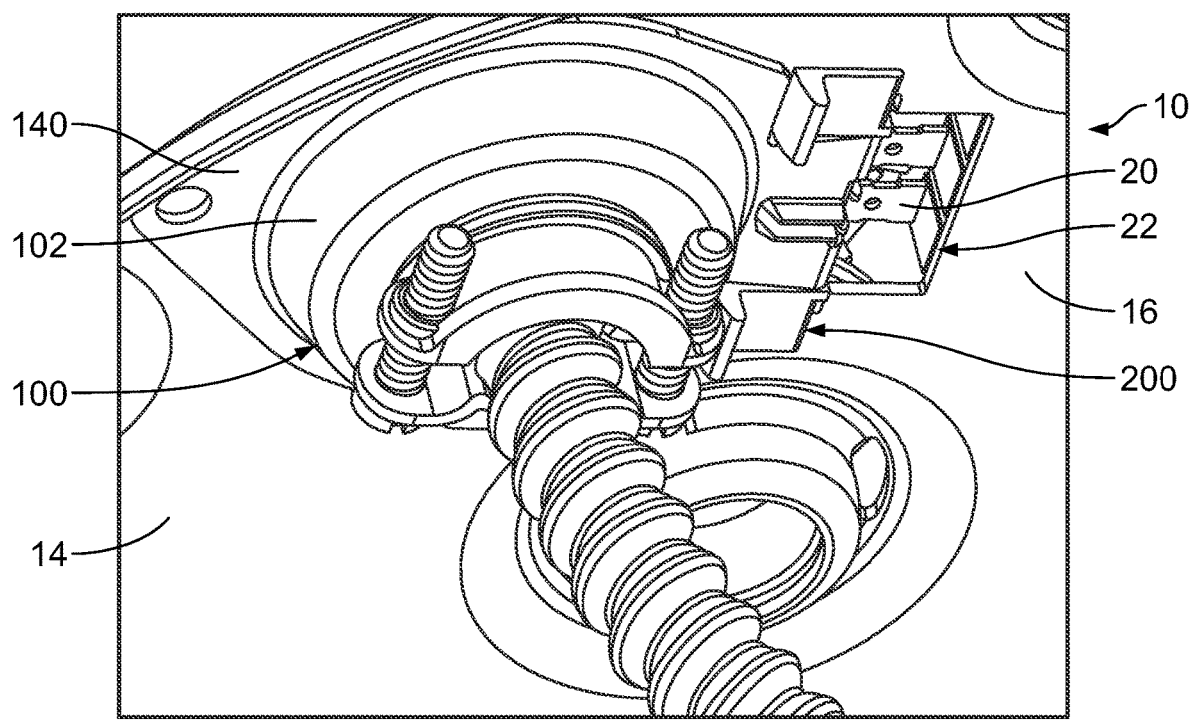
FIG. 16 illustrates the electrical connector assembly partially coupled to the electrical device in accordance with an exemplary embodiment.

FIG. 15 illustrates the electrical connector assembly 100 poised for coupling to the electrical device 10. FIG. 16 illustrates the electrical connector assembly 100 partially coupled to the electrical device 10. During assembly, the electrical connector assembly 100 is coupled to the bottom wall 16 of the device housing 14. The poke-in wire connector 200 is loaded into the opening 22 of the wall 16 such that the poke-in wire connector 200 is positioned within the cavity 18 of the device housing 14. The poke-in wire connector 200 interfaces with the tab terminals 20 within the interior of the device housing 14.

During assembly, the guide pins 230 are aligned with guide openings 26 in the bottom wall 16. The guide openings 26 and the guide pins 230 properly positioned the poke-in wire connector 200 within the electrical device 10. The poke-in wire connector 200 is loaded through the opening 22 until the mounting plate 140 of the cover plate 102 is seated against the bottom wall 16 of the device housing 14. Once the poke-in wire connector 200 is loaded through the opening 22, the electrical connector assembly 100 may be slid forward to mate the poke-in wire connector 200 with the tab terminals 20. For example, the tab terminals 20 may be received in the cavities 220 of the housing 202 to mate with the poke-in terminals 300. The tab terminals 20 are received in the tab terminals sockets 320 of the poke-in terminals 300 as the electrical connector assembly 100 is slid forward in a mating direction. Once mated, the cover plate 102 may be secured to the bottom wall 16 of the device housing 14 using the fastener 24 (shown in FIG. 2).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembly comprising:
a cover plate including a mounting flange configured to be mounted to a device housing of an electrical device, the cover plate including an opening;
a strain relief device coupled to the cover plate at the opening of the cover plate, the strain relief device included a bore therethrough configured to receive a power cable including a plurality of power wires including a ground wire, a hot wire and a neutral wire, the strain relief device providing strain relief for the power cable; and a poke-in wire connector coupled to the cover plate, the poke-in wire connector including a housing having terminal cavities and poke-in terminals received in corresponding terminal cavities, the poke-in terminals configured to be electrically connected to the ground wire, the hot wire and the neutral wire, each poke-in terminal including a main body extending between a mating end and a terminating end, a tab terminal socket at the mating end, and a wire socket at the terminating end, the tab terminal socket provided at a front of the housing for receiving a corresponding tab terminal of the electrical device, the wire socket provided at a rear of the housing for receiving a corresponding power wire during a poke-in process, the wire socket including a first wall, a second wall, a third wall, and a fourth wall forming a wire receptacle configured to receive the corresponding power wire, the wire socket including a first poke-in retention beam configured to interface with the power wire when poked into the wire socket and a second poke-in retention beam configured to interface with the power wire when poked into the wire socket, the wire socket including a wire release element configured to be actuated to release the first and second poke-in retention beams from the power wire;

wherein the housing includes a guide pin configured to guide mating of the housing with respect to the device housing of the electrical device.

2. The electrical connector assembly of claim 1, wherein the bore of the strain relief device receives a conduit surrounding the power cable, the strain relief device being coupled to the conduit.

3. The electrical connector assembly of claim 1, wherein the cover plate includes a mounting tab extending therefrom, the housing of the poke-in wire connector including a pocket receiving the mounting tab of the cover plate, the housing of the poke-in wire connector including a latch that is latchably coupled to the cover plate.

4. The electrical connector assembly of claim 1, wherein the housing includes release openings aligned with the wire release elements of the poke-in terminals to access the wire release elements from an exterior of the housing.

5. The electrical connector assembly of claim 1, wherein the wire release element is deflectable into the wire receptacle to interface with the first and second poke-in retention beams.

6. The electrical connector assembly of claim 1, wherein the wire release element includes a main beam extending between a fixed end and a free end, the wire release element including a first deflecting tab extending from the main body of the wire release element at the free end to engage the first poke-in retention beam, the wire release element including a second deflecting tab extending from the main body of the wire release element at the free end to engage the second poke-in retention beam.

7. An electrical device assembly comprising:

an electrical device having a device housing, the device housing including at least one wall forming a cavity in which are housed one or more powered components and in which are situated a plurality of tab terminals, wherein the at least one wall includes a first wall with a first opening defined therein; and an electrical connector assembly comprising:
a cover plate through which a plurality of power wires of a power cable including a ground wire, a hot wire and a neutral wire can extend, the cover plate having a second opening and a mounting flange configured to be mounted to the device housing of the electrical device, and a poke-in wire connector coupled to the cover plate, the poke-in wire connector including a housing having terminal cavities and poke-in terminals received in corresponding terminal cavities, the poke-in terminals configured to be electrically connected to the ground wire, the hot wire and the neutral wire, each poke-in terminal including a main body extending between a mating end and a terminating end, a tab terminal socket at the mating end, and a wire socket at the terminating end, the tab terminal socket provided at the front of the housing for receiving a corresponding tab terminal of the electrical device, the wire socket provided at the rear of the housing for receiving a corresponding power wire during a poke-in process, the wire socket including a first wall, a second wall, a third wall, and a fourth wall forming a wire receptacle configured to receive the corresponding power wire, the wire socket including a first poke-in retention beam configured to interface with the power wire when poked into the wire socket and a second poke-in retention beam configured to interface with the power wire when poked into the wire socket, wherein the housing includes a guide pin to guide mating of the housing with respect to the device housing of the electrical device, wherein the electrical connector assembly is coupled to the electrical device in a manner so that the poke-in wire connector is positioned within the cavity of the device housing, and wherein the cover plate of the electrical connector assembly is secured to the device housing by one or more fasteners.

8. The electrical device assembly of claim 7, further comprising:

a strain relief device coupled to the cover plate at the second opening of the cover plate, the strain relief device included a bore therethrough configured to receive the power cable including the plurality of power wires, the strain relief device providing strain relief for the power cable.

9. The electrical device assembly of claim 7, wherein the housing includes a top housing wall, a bottom housing wall, a first housing side wall, and a second housing side wall, wherein the terminal cavities extend between a front and a rear of the housing, the housing including separating walls between the terminal cavities.

10. The electrical device assembly of claim 9, wherein the tab terminal socket includes a top wall, a bottom wall, a first side wall, and a second side wall forming a tab terminal receptacle configured to receive the corresponding tab terminal, the tab terminal socket including upper beam contacts extending from the top wall into the tab terminal receptacle to interface with the tab terminal and lower beam contacts extending from the bottom wall into the tab terminal receptacle to interface with the tab terminal.

11. The electrical device assembly of claim 7, wherein the wire socket includes a wire release element configured to be actuated to release the first and second poke-in retention beams from the power wire.

12. The electrical device assembly of claim 7, wherein the first opening of the first wall includes guide openings and, when the electrical connector assembly is installed in relation to the electrical device, the guide pins are aligned with the guide openings so that the poke-in wire connector is positioned within the electrical device.

13. The electrical device assembly of claim 12, wherein the electrical connector assembly is configured so that, when the poke-in wire connector is positioned within the electrical device to an extent that the mounting flange of the cover plate is seated against the first wall, the electrical connector assembly can be slid to mate the poke-in wire connector with the tab terminals of the plurality of tab terminals.

14. The electrical device assembly of claim 13, wherein the wire socket includes a wire release element configured to be actuated to release the first and second poke-in retention beams from the power wire.

15. A process comprising:
providing an electrical device and an electrical connector assembly,
wherein the electrical device has a device housing, the device housing including at least one wall forming a cavity in which are housed one or more powered components and in which are situated a plurality of tab terminals, wherein the at least one wall includes a first wall with a first opening and also including guide openings; and
wherein the electrical connector assembly includes:
a cover plate through which a plurality of power wires of a power cable including a ground wire, a hot wire and a neutral wire can extend, the cover plate having a second opening and a mounting flange configured to be mounted to the device housing of the electrical device; and
a poke-in wire connector coupled to the cover plate, the poke-in wire connector including a housing having terminal cavities, poke-in terminals received in corresponding terminal cavities, and guide pins, the poke-in terminals configured to be electrically connected to the ground wire, the hot wire and the neutral wire, each poke-in terminal including a main body extending between a mating end and a terminating end, a tab terminal socket at the mating end, and a wire socket at the terminating end, the tab terminal socket provided at the front of the housing for receiving a corresponding tab terminal of the electrical device, the wire socket provided at the rear of the housing for receiving a corresponding power wire during a poke-in process, the wire socket including a first wall, a second wall, a third wall, and a fourth wall forming a wire receptacle configured to receive the corresponding power wire, the wire socket including a first poke-in retention beam configured to interface with the power wire when poked into the wire socket and a second poke-in retention beam configured to interface with the power wire when poked into the wire socket;
aligning the guide pins with the guide openings;
loading the poke-in wire connector through the first opening until the mounting flange is seated against the first wall; and
sliding the electrical connector assembly relative to the electrical device so that the tab terminals are received in the tab terminal sockets.

16. The process of claim 15, further comprising securing the cover plate to the first wall by a fastener.

17. The process of claim 16, wherein the wire socket includes a wire release element configured to be actuated to release the first and second poke-in retention beams from the power wire.

18. The process of claim 16, further comprising a strain relief device coupled to the cover plate at the second opening of the cover plate, the strain relief device included a bore therethrough configured to receive the power cable including the plurality of power wires, the strain relief device providing strain relief for the power cable.

19. The process of claim 18,
wherein the housing includes a top housing wall, a bottom housing wall, a first housing side wall, and a second housing side wall, wherein the terminal cavities extend between a front and a rear of the housing, the housing including separating walls between the terminal cavities.

20. The process of claim 19,
wherein the tab terminal socket includes a top wall, a bottom wall, a first side wall, and a second side wall forming a tab terminal receptacle configured to receive the corresponding tab terminal, the tab terminal socket including upper beam contacts extending from the top wall into the tab terminal receptacle to interface with the tab terminal and lower beam contacts extending from the bottom wall into the tab terminal receptacle to interface with the tab terminal.

* * * * *